United States Patent [19]
Hatano et al.

[11] Patent Number: 5,627,600
[45] Date of Patent: May 6, 1997

[54] LUMINANCE AND CHROMINANCE SIGNAL SEPARATOR USING CORRELATION DETECTION

[75] Inventors: Takahisa Hatano, Sapporo; Yoshihisa Nishigori, Itami, both of Japan

[73] Assignee: Matsushita Electric Industrial Co., Ltd., Osaka, Japan

[21] Appl. No.: 688,232

[22] Filed: Jul. 29, 1996

Related U.S. Application Data

[63] Continuation of Ser. No. 326,764, Oct. 20, 1994, abandoned.

[30] Foreign Application Priority Data

Oct. 21, 1993 [JP] Japan ..................... 5-263398

[51] Int. Cl.[6] .................................... H04N 9/78
[52] U.S. Cl. ............................. 348/668; 348/667
[58] Field of Search ..................... 348/663–668; H04N 9/78

[56] References Cited

U.S. PATENT DOCUMENTS

| | | | |
|---|---|---|---|
| 4,893,176 | 1/1990 | Faroudja | 348/665 X |
| 4,954,885 | 9/1990 | Ito et al. | 348/668 |

FOREIGN PATENT DOCUMENTS

| | | | |
|---|---|---|---|
| 412790 | 2/1991 | European Pat. Off. | H03H 21/00 |
| 4-81192 | 3/1992 | Japan | H04N 9/78 |
| 4-81191 | 3/1992 | Japan | H04N 9/78 |
| 2241403 | 8/1991 | United Kingdom | H04N 9/78 |
| 2244885 | 12/1991 | United Kingdom | H04N 9/78 |
| 2247806 | 3/1992 | United Kingdom | H04N 9/78 |
| 2271907 | 4/1994 | United Kingdom | H04N 9/78 |

*Primary Examiner*—John K. Peng
*Assistant Examiner*—John W. Miller
*Attorney, Agent, or Firm*—Ratner & Prestia

[57] ABSTRACT

A device that separates a luminance signal and a chrominance signal from an input composite color television signal, suppressing cross color interference and keeping a good color transient characteristic, by selecting characteristics of the color bandpass filters according to a vertical correlation value after obtaining a chrominance signal at an adaptive type comb filters. The apparatus includes a cascade connection of a plurality of delay devices each one of which delays one horizontal period; chrominance correlation detecting circuits for obtaining correlation of a chrominance signal between a reference signal and a signal at the vertical vicinity of the point of the reference signal on the screen, where an output signal of the central delay device is regarded as a reference signal; luminance correlation detecting circuits for obtaining correlation of a luminance signal between the reference signal and a signal at the vertical vicinity of the point of the reference signal on the screen; a correlation judging circuit for judging if there is correlation from the correlation of the chrominance signals and the correlation of the luminance signals; comb filters for separating a chrominance signal from the composite color television signal; and a selector for selecting an output of the comb filters according to the judgment of the correlation.

2 Claims, 3 Drawing Sheets

LUMINANCE AND CHROMINANCE SIGNAL SEPARATOR USING CORRELATION DETECTION

This application is a continuation of application Ser. No. 08/326,764 filed Oct. 20, 1994 now abandoned.

BACKGROUND OF THE INVENTION

(1) Field of the Invention

The present invention relates to luminance and chrominance signal separating apparatus for separating a luminance signal and a chrominance signal from a composite color television signal.

(2) Description of the Prior Art

Recently, progress of digital signal processing technique accompanies that an adaptive type luminance and chrominance signal separating apparatus which selects a plurality of filters according to exsistence of correlation between an arbitrary reference signal and the signals at the vicinity of the position of the reference signal in a horizontal or vertical direction on the screen in luminance and chrominance signal separating apparatus which separates a luminance signal and a chrominance signal from a composite color television signal.

FIG. 1 is a block diagram of a luminance and chrominance signal separating apparatus in accordance with the prior art.

A bandpass filter 501 extracts a chrominance signal component from a composite color television signal (hereafter, called VBS signal, which means video burst signal). Each one of 1 H delay devices 502, 503 and 504 delays a signal by 1 H period, where 1 H means one horizontal period. In digital circuits, memory devices are usually used as delay devices. A comb filter 505 separates a chrominance signal from the output signal of the bandpass filter 501 and the output signal of the 1 H delay device 502 which is delayed from the output signal of the bandpass filter 501 by 1 H period. A comb filter 506 separates a chrominance signal from the output signal of the 1 H delay device 502 which is delayed from the output signal of the bandpass filter 501 by 1 H period and the output signal of the 1 H delay device 503 which is delayed from the output signal of the bandpass filter 501 by 2 H periods.

An adder 507 adds the output signal of the bandpass filter 501 and the output signal of the delay device 502 which is delayed from the output signal of the bandpass filter 501 by 1 H period. An adder 508 adds the output signal of the 1 H delay device 502 which is delayed from the output signal of the bandpass filter 501 by 1 H period and the output signal of the 1 H delay device 503 which is delayed from the output signal of the bandpass filter 501 by 2 H periods.

Absolute value circuits 509 and 510 calculate absolute values of the output signals of the adders 508 and 507, respectively. Low pass filters 511 and 512 filter the output signals of the absolute value circuits 509 and 510, respectively and output their average values. A comparator 513 compares the output signals of the low pass filters 511 and 512 and judges which output signal is smaller. A smaller average value means stronger correlation. A selector 514 selects an output signal of the comb filters 5 or 6 which has stronger correlation, based on the comparison result of the comparator 513. A subtracter 515 outputs a perfect luminance signal by subtracting a chrominance signal which is an output signal of the selector 514 from the signal which is delayed by 1 H period from the input VBS signal. A bandpass filter 516 outputs a perfect chrominance signal by limiting the bandwidth of the output signal of the selector 514.

A chrominance signal is extracted from the input VBS signal at the bandpass filter 501. The extacted chrominance signal component is supplied to the delay devices 502 and 503 in order and one input signal to the delay device 502 and the two output signals from the deley device 502 and 503 are supplied to the two comb filter 505 and 506. Because each comb filter 505 and 506 is supplied with two signals which have an 1 H period time difference, the output of each comb filter becomes a chrominance signal. A correlation value is obtained by adding an input signal and an output signal of each delay device 502 and 503 over an 1 H period. Because a chrominance signal inverts its phase every 1 H period, if the sum of the chrominance signal component during an 1 H period is zero, the chrominance signal can be regarded to have correlation. Actually, the average value of the absolute values of the sums during an 1 H period is a correlation value.

The comparator 513 compares the correlation values between an arbitrary reference signal and the signal 1 H ahead of the reference signal and between the reference signal and the signal 1 H behind the reference signal and judges which correlation value is smaller. The output signal of the comb filter 505 or 506 which is judged to have stronger correlation is selected at the selector 514 according to the output of the comparator 513. A luminance signal can be obtained by subtracting the chrominance signal selected at the selector 514 from the signal delayed by 1 H from the input VBS signal at the 1 H delay device 504. A better chrominance signal is obtained by passing the chrominance signal selected at the selector 514 through the bandpass filter 516.

However, a high frequency component of the luminance signal can not be distinguished with the chrominance signal in the above circuit configuration, misjudgment occurs in correlation judgment, for example, at the vicinity of the vertical edge of a multiburst signal and cross color interference occurs which a luminance signal mixes in a chrominance signal. A chrominance signal inverts its phase every 1 H period but the high frequency component of a luminance signal keeps the same phase. Therefore, if the high frequency component of the luminance signal has some correlation with the chrominance signal, the sum signal for the 1 H period is zero.

But if there is correlation in a luminance signal, the signal component is not zero but is double of the original component. Therefore, the correlation value differs depending on that it is correlation of a chrominance signal or correlation of a luminance signal.

SUMMARY OF THE INVENTION

The present invention offers a luminance and chrominance signal separating apparatus which hardly occurs cross color interference which a luminance signal mixes in a chrominance signal even when a high frequency component of the luminance signal exsists.

To solve the above-mentioned problem, a luminance and chrominance signal separating apparatus in accordance with the exemplary embodiment of the present invention includes a cascade connection of delay devices each one of which delays a VBS signal by 1 H period, a chrominance correlation detecting circuit for obtaining correlation of a chrominance signal between a reference signal and a signal at the vertical vicinity of the point corresponding to the reference signal on the screen, regarding a center output signal of the cascaded delay as a reference signal, a luminance correlation detecting circuit for obtaining correlation of a luminance signal between the reference signal and a signal at the vertical vicinity of the point corresponding to the reference signal, a correlation judging circuit for judging if there is correlation or not from the chrominance signal correlation and the luminance signal correlation, a plurality of comb filters for separating chrominance signal from the VBS signal, and a selector for selecting the outputs of the comb filters according to the result judged at the correlation judging

DETAILED DESCRIPTION OF THE INVENTION

Figure 1:
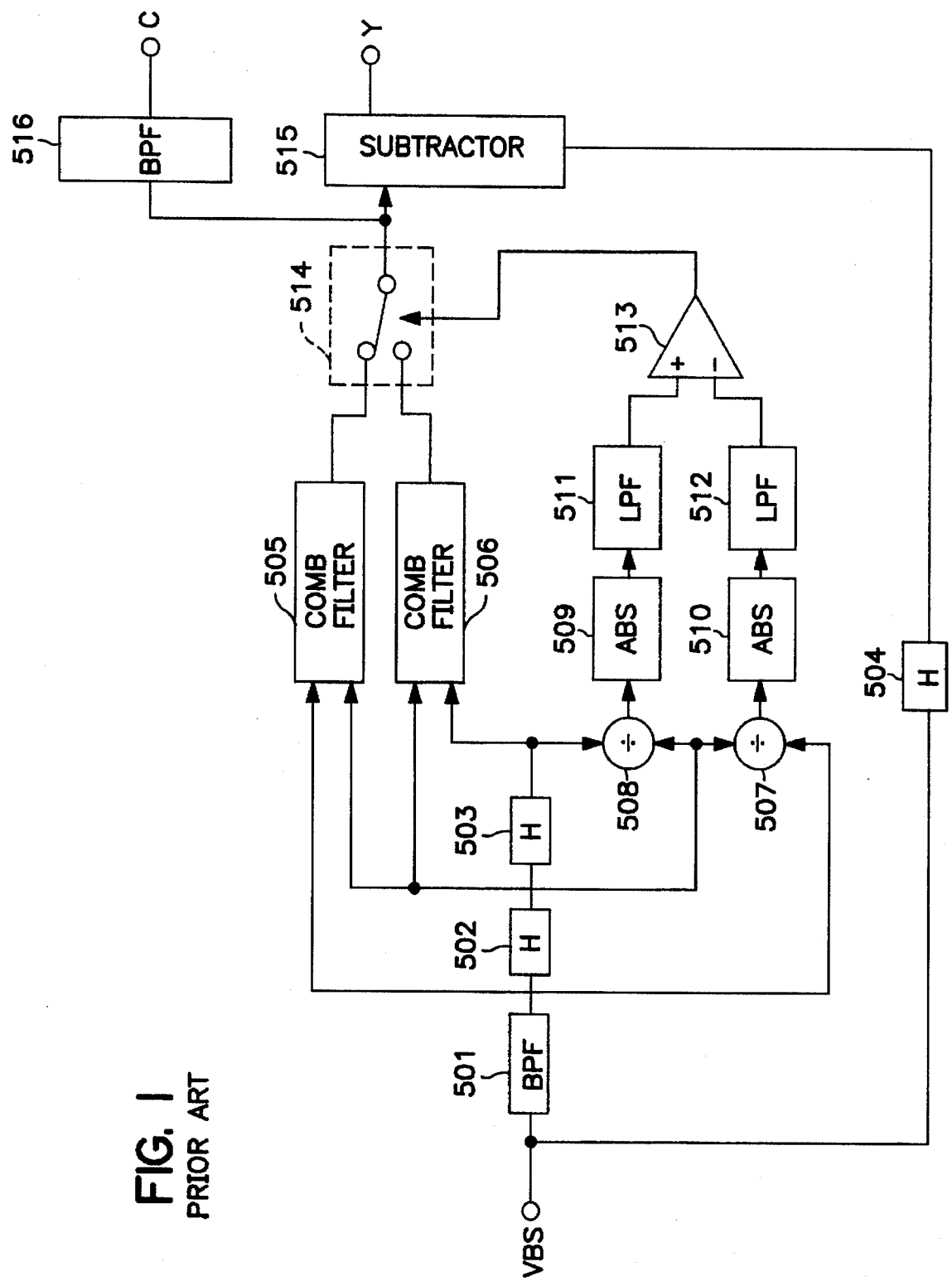
FIG. 1 is a block diagram of a luminance and chrominance signal separating apparatus in accordance with the prior art.
Figure 2:
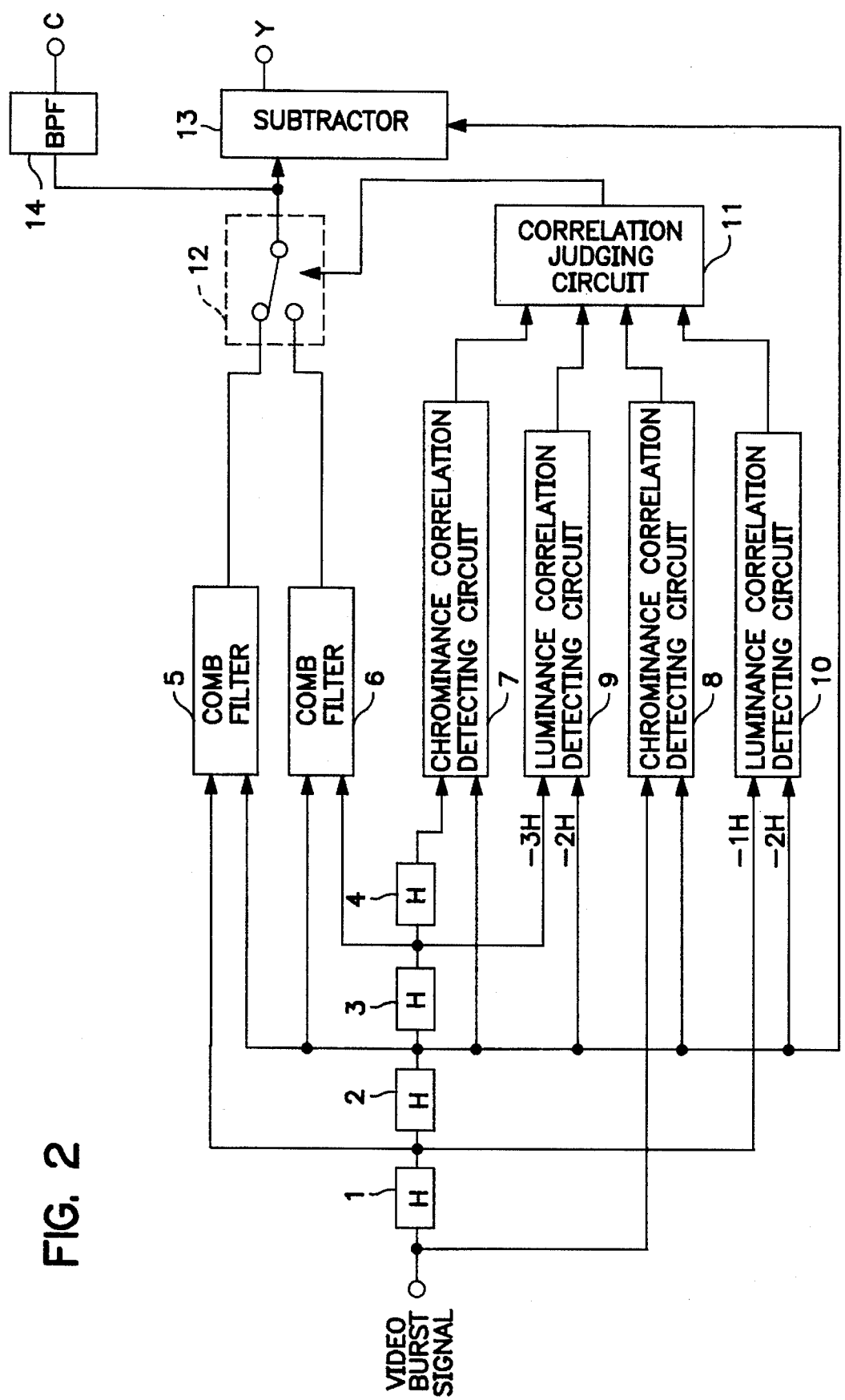
FIG. 2 is a block diagram of a luminance and chrominance signal separating apparatus in accordance with an exemplary embodiment of the present invention.

FIG. 2 is a block diagram of a luminance and chrominance signal separating apparatus in accordance with an exemplary embodiment of the present invention.

1 H delay devices 1, 2, 3 and 4 delay an input VBS signal by 1 H period in order. A comb filter 5 separates a chrominance signal from a signal which is delayed from the input VBS signal by 1 H period and a signal which is delayed from the input VBS signal by 2 H periods. A comb filter 6 separates a chrominance signal from a signal which is delayed from the input VBS signal by 2 H periods and a signal which is delayed from the input VBS signal by 3 H periods.

A chrominance correlation detecting circuit 7 outputs chrominance signal correlation from a signal which is delayed from the input VBS signal by 2 H periods and a signal which is delayed from the input VBS signal by 4 H periods. A chrominance correlation detecting circuit 8 outputs chrominance signal correlation from the input VBS signal and the signal which is delayed from the input VBS signal by 2 H periods. A luminance correlation detecting circuit 9 outputs luminance signal correlation from the input VBS signal and the signal which is delayed from the input VBS signal by 1 H period. A luminance correlation detecting circuit 10 outputs luminance signal correlation from a signal which is delayed from the input VBS signal by 1 H period and the signal which is delayed from the input VBS signal by 2 H periods.

A correlation judging circuit 11 judges which has stronger correlation, the output of the comb filter 5 or the comb filter 6, according to the output of the chrominance correlation detecting circuits 7 and 8 and the luminance correlation detecting circuits 9 and 10. A selector 12 selects an output of the comb filter 5 or 6, according to the output of the correlation judging circuit 11. A filter 13 outputs a perfectly separated luminance signal Y by subtracting a chrominance signal which is an output signal of the selector 12 from the signal which is delayed from the input VBS signal by 2 H periods. A bandpass filter 14 outputs a perfectly separated chrominance signal C by limiting the bandwidth of the output signal of the selector 12.

Figure 3:
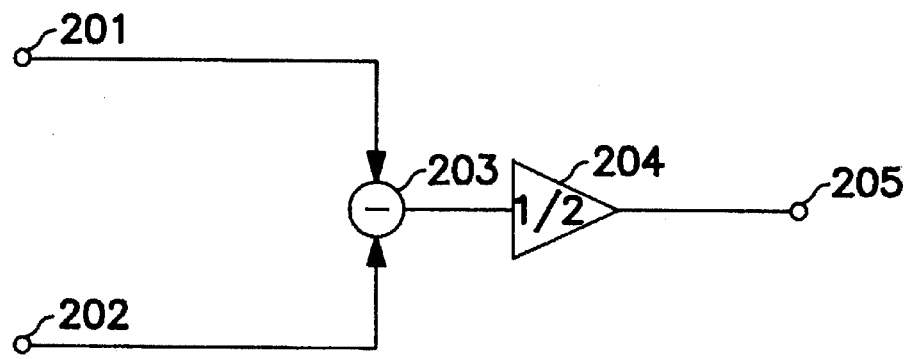
FIG. 3 is a block diagram of a comb filter used in a luminance and chrominance signal separating apparatus in accordance with the exemplary embodiment of the present invention.

FIG. 3 is a block diagram of a comb filter used in a luminance and chrominance signal separating apparatus in accordance with the exemplary embodiment of the present invention. A signal 201 is a signal delayed from the input VBS signal by 2 H periods. A signal 202 is a signal apart from (ahead of or behind) the signal 201 by 1 H period. A subtracter 203 subtracts the signal 202 from the signal 201. A divider 204 outputs a half value of the output of the subtracter 203. A chrominance signal 205 is obtained as an output signal of the divider 204.

Figure 4:
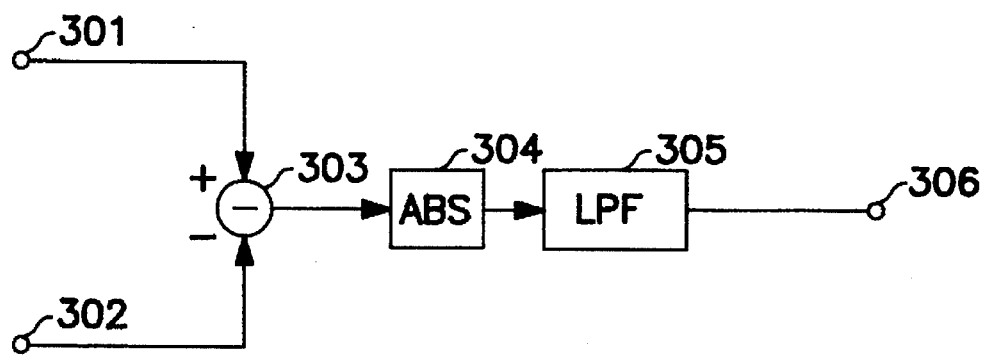
FIG. 4 is a block diagram of a chrominance correlation detecting circuit used in a luminance and chrominance signal separating apparatus in accordance with the exemplary embodiment of the present invention.

FIG. 4 is a block diagram of a chrominance correlation detecting circuit used in a luminance and chrominance signal separating apparatus in accordance with the exemplary embodiment of the present invention. A signal 301 is a signal which is delayed by 2 H periods from the input VBS signal. A signal 302 is a signal apart from the signal 301 by 2 H periods. A subtracter 303 subtracts the signal 302 from the signal 301. An absolute value circuit 304 outputs an absolute value of the output signal of the subtracter 303. A low pass filter 305 filters the output signal of the absolute value circuit 304 and outputs an average value of the absolute values. A signal 306 expresses a correlation value of the chrominance signal during 2 H periods which is an output signal of the low pass filter 305.

Figure 5:
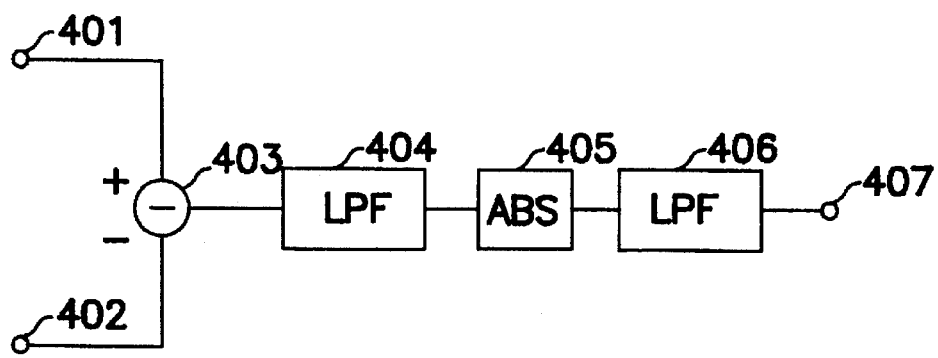
FIG. 5 is a block diagram of a luminance correlation detecting circuit used in a luminance and chrominance signal separating apparatus in accordance with the exemplary embodiment of the present invention.

FIG. 5 is a block diagram of a luminance correlation detecting circuit used in a luminance and chrominance signal separating apparatus in accordance with the exemplary embodiment of the present invention. A signal 401 is a signal which is delayed by the VBS signal from the input VBS signal. A signal 402 is a signal apart from the signal 401 by 1 H period. A subtracter 403 subtracts the signal 401 from the signal 402. A low pass filter 404 extracts a low frequency component of the output of the subtracter 403. An absolute value circuit outputs an absolute value of the 1 H difference signal of the low frequency component of the luminance signal which is an output signal of the low pass filter 404. Another low pass filter 406 filters the output signal of the absolute value circuit 405. An output signal 407 expresses a correlation value of the luminance signal during 1 H period which is an output signal of the low pass filter 406.

A VBS signal is inputted to the delay devices 1, 2, 3 and 4 in order and total five VBS signals including an input VBS signal of the delay device 1 and four output VBS signals from the delay devices 1, 2, 3 and 4 are used. A correlation value of the chrominance signal between an arbitrary reference signal and a signal apart from the reference signal by 2 H periods is outputted from the chrominance correlation detecting circuits 7 and 8. Another correlation value of the low frequency band luminance signal between the reference signal and a signal apart from the reference signal by 1 H period is outputted from the luminance correlation detecting circuits 9 and 10. According to the output signal of each correlation detecting circuit, the correlation judging circuit 11 judges in which correlation exsists, between the reference signal and the signal to the comb filter 5 or between the reference signal and the signal to the comb filter 6.

According to the judged result, the selector 12 selects the output of the comb filter 5 or 6. The subtracter 13 subtracts a chrominance signal outputted from the selector 12 from a signal delayed by 2 H periods from the input VBS signal and outputs a perfectly separated luminance signal Y. The bandpass filter 14 limits the bandwidth of the chrominance signal from the comb filter 5 or 6 selected at the selector 12 and outputs a perfect chrominance signal C.

A luminance and chrominance signal separating apparatus in according with the exemplary embodiment of the present invention includes a cascade connection of a plurality of delay devices each one of which delays an input VBS signal by one horizontal period in order, a plurality of chrominance correlation detecting circuits for detecting chrominance signal correlation between a reference signal and signals at the vertical vicinity of the point for the reference signal on the screen, where the output signal at the central junction of the cascade connected delay devices is regarded as a reference signal, a plurality of luminance correlation detecting circuits for detecting luminance signal correlation between a reference signal and signals at the vertical vicinity of the point for the reference signal, a correlation judging circuit for judging if there is correlation or not from the correlation of the chrominance signal and the correlation of the luminance signal, a plurality of comb filters for separating a chrominance signal from the VBS signal, a selecter for selecting an output of the comb filters according to the output of the correlation judging circuit, a subtracter for subtracting the chrominance signal from the selector from a signal delayed by 2 H periods from the input VBS signal, and a bandpass filter for limiting the bandwidth of the chrominance signal from the selector.

Thus, a luminance signal and a chrominance signal are clearly separated from a composite color television signal with less cross color interference which occurs when a luminance signal mixes in a chrominance signal even when a luminance signal contains a high frequency component.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A luminance and chrominance signal separating apparatus comprising:

a cascade connection of at least four delay means, where each delay means delays a composite color television signal by a horizontal period and a signal at a junction point of said cascade connected delay means is regarded as a reference signal;

at least two chrominance correlation detecting means for calculating chrominance correlation values of a chrominance signal between said reference signal and signals at the vertical vicinity of said reference signal on the screen, wherein each of the signals in the vertical vicinity of said reference signal is separated from the reference signal by a delay greater than one horizontal period;

at least two luminance correlation detecting means for calculating luminance correlation values of a luminance signal between said reference signal and signals vertically adjacent to said reference signal on the screen;

a correlation judging means for judging if there is correlation or not from the chrominance correlation values and luminance correlation values;

a plurality of comb filters for separating a chrominance signal from said composite color television signal;

selecting means for selecting the outputs of said comb filters according to the correlation judged at said correlation judging means;

frequency band limiting means for limiting the output signal of said selecting means and outputting a chrominance signal; and subtracting means for subtracting the output signal of said selecting means from said reference signal and outputting a luminance signal.

2. A luminance and chrominance signal separating apparatus comprising:

a cascade connection of at least four delay means, where each delay means delays a composite color television signal by a horizontal period and a signal at the central junction point of said cascade connected delay means is regarded as a reference signal, if the number of said delay means is even, and a signal at the junction point just ahead of or just behind the central delay means of said cascade connected delay means is regarded as a reference signal, if the number of said delay means is odd;

at least two chrominance correlation detecting means for calculating chrominance correlation values of a chrominance signal between said reference signal and signals at the vertical vicinity of said reference signal on the screen, wherein each of the signals in the vertical vicinity of said reference signal is separated from the reference signal by a delay greater than one horizontal period;

at least two luminance correlation detecting means for calculating luminance correlation values of a luminance signal between said reference signal and signals vertically adjacent to said reference signal on the screen;

a correlation judging means for judging if there is correlation or not from the chrominance correlation values and luminance correlation values;

a plurality of comb filters for separating a chrominance signal from said composite color television signal;

selecting means for selecting the outputs of said comb filters according to the correlation judged at said correlation judging means;

frequency band limiting means for limiting the output signal of said selecting means and outputting a chrominance signal; and subtracting means for subtracting the output signal of said selecting means from said reference signal and outputting a luminance signal.

* * * * *